May 21, 1968 J. B. SIMMS 3,384,275
DETACHABLE COMBINATION BOTTLE HANDLE AND POURING SPOUT
Filed June 14, 1967
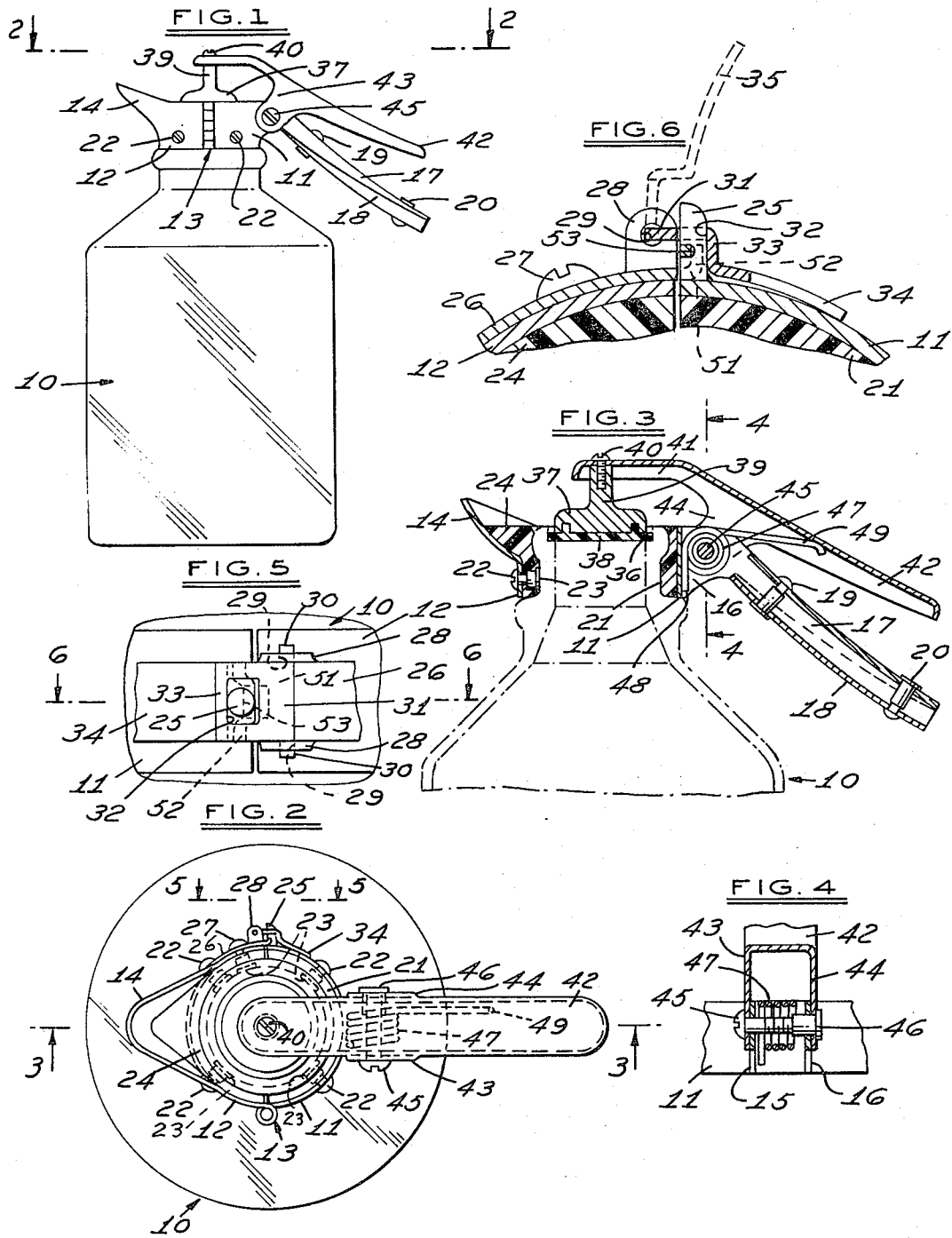
INVENTOR.
JAMES B. SIMMS
BY
Donnelly, Mentag & Harrington
ATTORNEYS United States Patent Office 3,384,275
Patented May 21, 1968

3,384,275
DETACHABLE COMBINATION BOTTLE HANDLE
AND POURING SPOUT
James B. Simms, 8441 Birch Road,
Taylor, Mich. 48180
Filed June 14, 1967, Ser. No. 646,040
5 Claims. (Cl. 222—474)

ABSTRACT OF THE DISCLOSURE

A combination bottle handle and pouring spout apparatus for use on large milk bottles and the like, and which includes a semi-circular rear housing portion and a semi-circular front housing portion hingedly connected to said rear housing portion, whereby the housing may be opened for mounting the handle on a bottle. The handle and spout apparatus also includes a releasable locking means for securing the rear housing portion to said front housing portion after these portions have been mounted on a bottle. The front housing portion has a pouring spout formed thereon. A handle is attached to the rear housing portion, a cover is hingedly connected to said rear housing portion, a spring normally biases said cover to a closed position, and a cover handle is provided for opening said cover when the bottle is lifted by said handle.

Summary of the invention

This invention relates to a novel and improved detachable combination bottle handle and pouring spout, and more particularly, to a combination bottle handle and pouring spout which may be quickly and easily assembled on a bottle.

In order to reduce the cost of milk, fruit juices, and the like, many producers sell these fluids in large bottles, as for example, gallon and half gallon sizes. The merchandizing of milk, fruit juices and the like in large bottles permits the user to purchase such fluids at reduced prices but the size and weight of the larger bottles used for such purposes creates a problem of handling and pouring the fluids from the large bottles. Accordingly, it is an important object of the present invention to provide a novel and improved combination bottle handle and pouring spout which may be quickly and easily mounted on a bottle and with which a large bottle may be easily handled and the contents poured therefrom in an easy and efficient manner.

It is still another object of the present invention to provide a novel and improved combination bottle handle and pouring spout which may be quickly and easily mounted on a bottle, and which is simple and compact in construction, economical to manufacture, and light in weight.

It is a further object of the present invention to provide a novel and improved combination bottle handle and pouring spout which includes a semi-circular rear housing portion, a semi-circular front housing portion hingedly connected to said rear housing portion, whereby the housing may be opened for mounting the handle on a bottle, means for securing the rear housing portion to said front housing portion after these portions have been mounted on a bottle, said front housing portion having a pouring spout formed thereon, a handle attached to said rear housing portion, cover means hingedly connected to said rear housing portion, means for normally biasing said cover means to a closed position, and means for opening said cover when the bottle is lifted by said handle.

Other objects, features and advantages of this invention will be apparent from the following detailed description, appended claims, and the accompanying drawing.

In the drawing:

FIG. 1 is a side elevational view of a large size bottle on which is mounted a handle made in accordance with the principles of the present invention;

FIG. 2 is a top plan view of the bottle and bottle handle structure shown in FIG. 1, taken along the line 2—2 thereof, and looking in the direction of the arrows;

FIG. 3 is a fragmentary, elevational section view of the bottle and bottle handle structure shown in FIG. 2, taken along the line 3—3 thereof, and looking in the direction of the arrows;

FIG. 4 is a fragmentary, elevational section view of the bottle handle structure illustrated in FIG. 3, taken along the line 4—4 thereof, and looking in the direction of the arrows;

FIG. 5 is a fragmentary, slightly enlarged, elevational view of the structure illustrated in FIG. 2, taken along the line 5—5 thereof, and looking in the direction of the arrows; and, FIG. 6 is a fragmentary, enlarged, horizontal section view of the structure illustrated in FIG. 5, taken along the line 6—6 thereof, and looking in the direction of the arrows.

Referring now to the drawing and in particular to FIG. 1, the numeral 10 generally indicates a large size milk bottle, as for example a gallon milk bottle, on which an illustrative combination bottle handle and pouring spout is mounted. The illustrative embodiment of the invention includes a rear housing portion 11 which is semi-circular and which is connected at one end thereof by the hinge 13 to one end of the semi-circular front housing portion 12. The front housing portion 12 coacts with the rear housing 11 to provide a circular housing. The hinge 13 may be of any suitable type. As best seen in FIGS. 1, 2 and 3, the front housing portion 12 is provided with an integral pouring spout 14 which is formed on the front end of the front housing portion 12.

As best seen in FIG. 4, a pair of vertical, laterally spaced apart handle attachment plates 15 and 16 are attached to the rear side of the rear housing portion 11 at a point diametrically opposite to the pouring spout 14. As shown in FIGS. 3 and 5, a handle 17 is integrally attached to the plates 15 and 16. The handle 17 is substantially inverted U-shaped in cross section and is enclosed on the lower side thereof with a handle insert 18 which is attached to the handle 17 by any suitable means as by the rivets 19 and 20. It will be understood that any other suitable handle insert attaching means may be used, as for example screws.

As shown in FIGS. 2 and 3, the rear housing portion 11 carries on the inner side thereof a semi-circular rear insert 21 which is provided with an outer face shaped to fit the mouth of a milk bottle so that it may fit securely therearound. The rear insert 21 is attached to the rear housing portion 11 by any suitable means, as by a plurality of screws 22 which are threadably engaged with the nuts 23. The front housing portion 12 is also provided with a similar insert 24 which is formed in the same manner as the rear insert 21 and which is secured to the front housing portion 12 by any suitable means, as by the screws 22 and nuts 23.

As shown in FIGS. 2, 5 and 6, the combination bottle handle and spout is provided with means for releasably locking the rear housing portion 11 and the front housing portion 12 to the bottle 10. The releasable locking means includes a first arcuate plate 26 which is attached to the front housing portion 12 by any suitable means, as by the combination screw and nut means indicated by the numeral 27. Integrally formed on the plate 26 is a pair of vertically spaced apart, horizontally disposed ears or projections 28.

As shown in FIGS. 5 and 6, the ears 28 are provided with the holes 27 for rotatably receiving the safts or hinge pins 30 which are formed on the front portion 31 of a locking lever. The front end of the locking lever 31 is provided with a hole 32 which is adapted to receive a locking pin 25 when the locking lever is swung to the solid line position shown in FIG. 6, to lock the front housing portion 12 on the rear housing portion 11. The locking lever includes the intermediate lever portion 33 which is disposed perpendicularly to the front end portion 31, and the arcuate rear end portion 34. The numeral 35 in FIG. 6 indicates the open position of the locking lever.

As shown in FIG. 3, the bottle opening 36 is adapted to be inclosed by a circular cover 37 which is provided with a circular cover seal 38. The cover 37 is provided with an integral shaft 39 which is secured by a screw 40 to the front end 41 of a suitable cover handle. A rear end or hand engaging end of the cover handle is indicated by the numeral 42 and is disposed in vertical alignment over the bottle carrying handle 17. As shown in FIG. 4, the cover handle 42 is provided with a pair of spaced apart downwardly extended cover mounting plates 43 and 44 which straddel the handle plates 15 and 16. The cover mounting plates 43 and 44 are pivotally mounted on the handle plates 15 and 16 by a screw shaft 45 an a nut 46. The cover handle 42 is normally biased in a counterclockwise direction, so as to maintain the cover 37 in the closed position as shown in FIG. 3, by the spring 47 which has one end 48 abutting the outer face of the rear housing portion 11 and a second end 49 abutting the inner side of the cover handle portion 42.

In use, the combination bottle handle and spout of the present invention is disposed relative to the bottle 10 so as to bring the mouth of the bottle adjacent to the housing inserts 21 and 24. The locking lever is swung to the dotted line open position 35 of FIG. 6, the front housing portion 12 is swung away from the rear housing portion 11, and the two housing portions are then fitted around the mouth of the bottle 10 and the locking lever moved to the closed, solid line position shown in FIG. 6 to secure the apparatus to the bottle 10. The combination handle and pouring spout may be quickly and easily detached from the bottle 10 by reversing the aforestated steps. Fluid may be poured from the bottle 10 by grasping the cover handle 42 and the bottle handle 17 with a simultaneous grasping movement and tipping the bottle into a pouring position. It will be seen that when the bottle 10 is lifted by grasping the handle 17, the cover handle 42 is always simultaneously grasped and the cover 37 automatically moved to an open position for pouring purposes.

The handle 17, the housing portions 11 and 12, the cover 39 and the cover handle 42 may be made from any suitable material as for example, stainless steel or a fine grade of aluminum that may be washed thoroughly in the same manner as other kitchen utensils. The seal member 38 may be made from any suitable material which may be thoroughly cleaned, as for example a plastic material. The inserts 21 and 24 may be made from any suitable resilient material, as a suitable rubber material which may be thoroughly washed. The inserts 21 and 24 may also be made from a suitable plastic material. It will be understood that the combination handle and spout may be adapted for use on many types of bottles, as for example, kitchen cleanser bottles, milk bottles, and the like, by merely changing the sizes of the appropriate mounting parts.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A detachable combination bottle handle and pouring spout for mounting around the open end of a bottle comprising:
   (a) a circular housing including a semi-circular rear housing portion and a semi-circular front housing portion;
   (b) said semi-circular front housing portion being provided with a pouring spout;
   (c) means hingedly connecting one of the ends of the semi-circular rear housing portion to one of the ends of the semi-circular front housing portion;
   (d) releasable locking means detachably connecting the other end of the semi-circular rear housing portion to the other end of the semi-circular front housing portion;
   (e) a handle attached to said semi-circular rear housing portion; and,
   (f) a cover means hingedly mounted on said semi-circular rear housing portion for normally closing the open end of a bottle on which the combination bottle handle and pouring spout is mounted.

2. A detachable combination bottle handle and pouring spout as defined in claim 1, wherein:
   (a) each of said semi-circular rear and front housing portions is provided with inserts shaped in accordance with the shape of the open end of the bottle on which the combination handle and spout is adapted to be mounted.

3. A detachable combination bottle handle and pouring spout as defined in claim 1, wherein said releasable locking means includes:
   (a) a lock pin mounted on one of said semi-circular housing portions; and,
   (b) a hingedly mounted locking lever mounted on the other of said housing portions and provided with an aperture through which said locking pin is adapted to be received when the locking lever is swung to a locking position.

4. A detachable combination bottle handle and pouring spout as defined in claim 1, wherein said cover means includes:
   (a) a cover member adapted to be normally seated over the open end of a bottle;
   (b) a cover member handle hingedly mounted on said sami-circular rear housing portion; and,
   (c) biasing means for normally biasing said cover member into a bottle closing position.

5. A detachable combination bottle handle and pouring spout as defined in claim 4, wherein:
   (a) said cover member handle is disposed over said first mentioned handle attached to said semi-circular rear housing portion; and,
   (b) said biasing means for biasing the cover member to a closed position comprises a spring means.

References Cited

UNITED STATES PATENTS

| 2,348,527 | 5/1944 | Darnell | 222—473 |
| 2,590,596 | 3/1952 | Ziskin et al. | 222—474 |
| 3,154,227 | 10/1964 | Anderson et al. | 222—465 X |
| 3,171,574 | 3/1965 | Simms | 222—467 |

FOREIGN PATENTS

| 207,063 | 1/1960 | Austria. |
| 860,367 | 9/1940 | France. |
| 1,206,773 | 8/1959 | France. |

SAMUEL F. COLEMAN, *Primary Examiner.*